April 26, 1927.
J. F. RAMBO
HYDRAULIC MOTOR
Filed Jan. 15, 1925
1,626,298
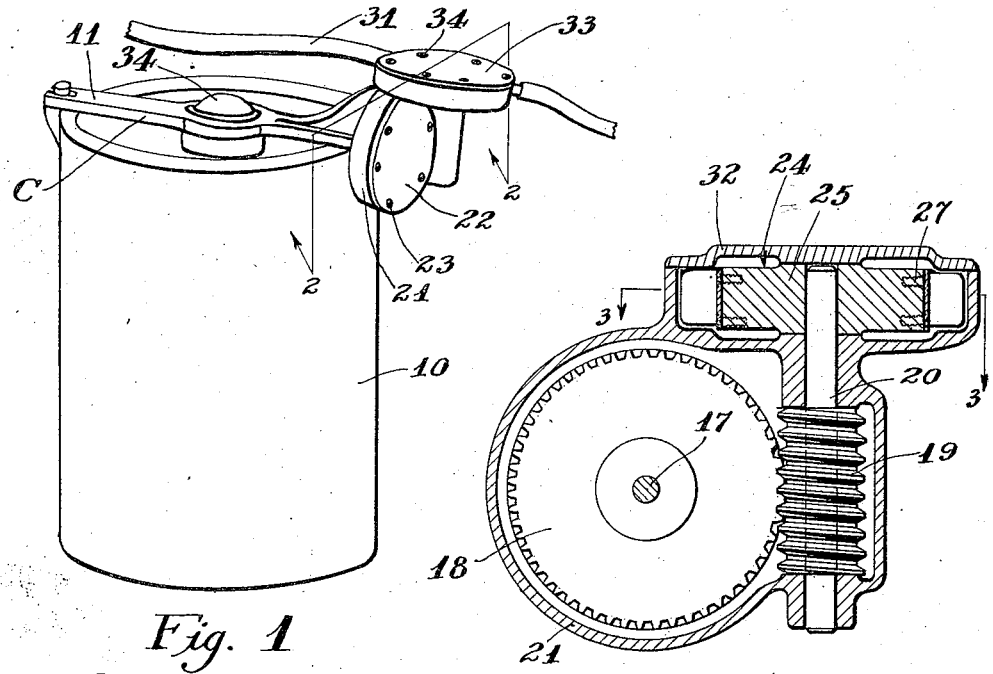
Fig. 1
Fig. 2
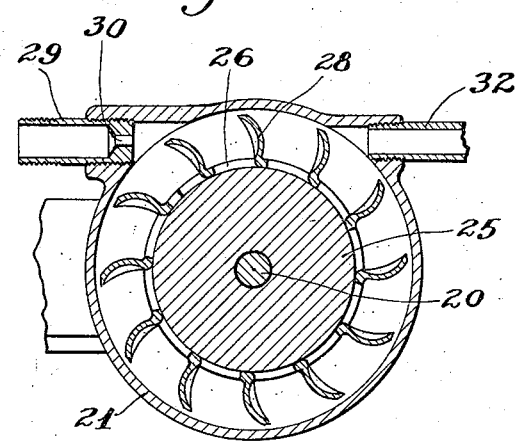
Fig. 3
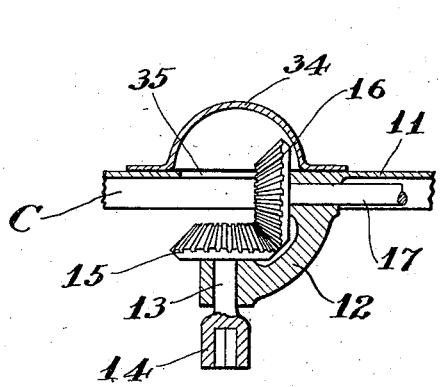
Fig. 4
Inventor
Joseph F. Rambo
by Hazard and Miller
Attorneys Patented Apr. 26, 1927.

1,626,298

UNITED STATES PATENT OFFICE.

JOSEPH F. RAMBO, OF POMONA, CALIFORNIA.

HYDRAULIC MOTOR.

Application filed January 15, 1925. Serial No. 2,537.

This invention relates to improvements in ice cream freezers and mechanisms for operating the same.

It is an object of the invention to provide a simple, cheap and durable hydraulic motor for household use, e. g., for rotating the inner container in an ice cream freezer.

With the foregoing and other objects in view which will be made manifest in the following detailed description and pointed out in the appended claims, reference is had to the accompanying drawings for an illustrative embodiment of the invention, wherein:

Figure 1 is a perspective view showing the improved ice cream freezer with the hydraulic motor attached;

Fig. 2 is a vertical section taken substantially on the section 2—2 of Fig. 1;

Fig. 3 is a horizontal section taken substantially on the line 3—3 of Fig. 2; and Fig. 4 is a vertical section showing a detail of construction.

Referring to the accompanying drawings wherein similar reference characters designate similar parts throughout, I have shown my improved motor in connection with an ice cream freezer. The ice cream freezer consists of an outer container 10, as in the conventional ice cream freezer, which is usually formed of wood. This outer container is adapted to contain the ice which is packed about an inner container, not shown, which is rotatably mounted centrally within the outer container 10. The inner container has its cover provided with a squared pin in the usual form of freezer, and this container, which is usually formed of a metal, is adapted to hold the cream which is to be frozen. Across the top of the outer container 10 there extends a transverse member 11, which may be removed from the outer container, if desired. An arm 12 which may be integral with or otherwise secured to the member 11 extends downwardly within the outer container 10 above the inner container therewithin. A stub shaft 13 is rotatably mounted upon the arm 12 and is provided with a squared socket portion 14 which is adapted to receive the pin formed upon the cover of the inner container, as before mentioned. The upper end of the stub shaft 13 has rigidly secured thereto a beveled gear 15 which meshes with a beveled gear 16 which is keyed or otherwise secured to a shaft 17 rotatably mounted upon the member 11.

Upon the outer end of the shaft 17 there is keyed or otherwise secured a worm wheel 18 which is in engagement with a worm 19 mounted upon a spindle 20. The worm wheel 18 and the worm 19 are preferably enclosed within a housing 21 which may be secured to, or formed integral with, the member 11. One side of the housing 21 is provided with a removable plate 22 secured to the housing 21 as by screws 23. The housing 21 preferably consists of two compartments, one which receives the worm wheel 18 and the worm 19, and the other receives a water wheel 24. The water wheel 24 consists of a wheel preferably formed of cast iron, as designated at 25, which is mounted upon the spindle 20. A band of sheet metal 26 is secured upon the periphery of the cast iron wheel 25 by screws 27. This band has suitable buckets 28 stamped out from its body. The compartment of the housing 21 which receives the water wheel 24 is provided with a nipple 29 having formed therein a nozzle or orifice 30. The nipple 29 is adapted to be connected by a hose 31 or other conduit to a tap or water faucet. Upon the opposite side of the compartment of the housing 21, which holds the water wheel, there is placed a nipple 32 leading to a drain or sink. The top of the compartment, holding the water wheel, is preferably a removable plate 33 secured to the housing 21 as by screws 34.

The operation of the motor is as follows: When the water is turned on at the water faucet, the water enters the housing through the conduit or hose 31, and is discharged through the nozzle 30 against the buckets 28 of the water wheel 24. This causes rotation of the water wheel and consequently produces rotation of the spindle 20. The water admitted to the housing 21 by being discharged against the buckets 28 passes out of the housing through the nipple 32 and may pass to the drain.

The plate 22 is removable so that the worm wheel 18 or the worm 19 may be replaced, should they become worn, and may be lubricated. The top plate 33 is removable so that the condition of the buckets 28 may be readily determined. If the buckets 28 should become damaged or rusted, by removing the band 26 by loosening the screws 27, a new set of buckets may be applied to the wheel 25 at a small amount of time and expense. The cover plate 35 is preferably placed over the aperture 36 formed in the member 11 to protect the beveled gears 15 and 16 and to prevent injury which might occur by the operator carelessly placing has hand near the aperture.

It will be understood that various changes in the detail of construction may be made without departing from the spirit or scope of the invention as defined by the appended claims.

I claim:

1. A water motor comprising a housing, means providing an inlet and outlet to and from the housing, a wheel rotatable in the housing, and a sheet metal band mounted upon the periphery of the wheel, said sheet metal band having portions struck out of its body providing buckets adapted to be struck by the stream entering the housing to rotate the wheel.

2. A water motor comprising a housing, means providing an inlet and outlet to and from the housing, a wheel rotatable in the housing, and a sheet metal band mounted upon the periphery of the wheel, said sheet metal band having portions struck out of its body between its side edges, providing buckets adapted to be struck by the stream entering the housing to rotate the wheel.

3. A water motor comprising a housing, means providing an inlet and an outlet to and from the housing, a wheel rotatable in the housing, and a sheet metal band detachably secured upon the periphery of the wheel, said sheet metal band having central portions in longitudinal alignment struck out from its body providing buckets adapted to be struck by the stream entering the housing to rotate the wheel.

In testimony whereof I have signed my name to this specification.

JOSEPH F. RAMBO.